US012597404B2

(12) United States Patent
Lucksom

(10) Patent No.: US 12,597,404 B2
(45) **Date of Patent: *Apr. 7, 2026**

(54) PORTABLE GRAVITY-GRIP MUSICAL INSTRUMENT STAND

(71) Applicant: GORU LLC, Northville, MI (US)

(72) Inventor: John Lucksom, Northville, MI (US)

(73) Assignee: GORU LLC, Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,627

(22) Filed: Jan. 25, 2024

(65) Prior Publication Data

US 2024/0177694 A1 May 30, 2024

Related U.S. Application Data

(63) Continuation of application No. 17/883,804, filed on Aug. 9, 2022, now Pat. No. 12,020,670.

(60) Provisional application No. 63/231,152, filed on Aug. 9, 2021.

(51) Int. Cl.
*G10G 5/00* (2006.01)
*G10D 3/00* (2020.01)

(52) U.S. Cl.
CPC ................ *G10G 5/00* (2013.01); *G10D 3/00* (2013.01)

(58) Field of Classification Search
CPC .. G10G 5/00; G10D 3/00; G10D 1/08; G10D 1/00
See application file for complete search history.

(56) References Cited

U.S. PATENT DOCUMENTS

| | | | | |
|---|---|---|---|---|
| 6,877,706 | B2 * | 4/2005 | Harrison | G10G 5/00 211/195 |
| 7,105,732 | B1 | 9/2006 | Hsieh | |
| 8,146,870 | B1 | 4/2012 | Cooper | |
| 8,490,942 | B1 | 7/2013 | Henry | |
| 8,967,585 | B2 | 3/2015 | Furuta et al. | |
| 9,010,700 | B1 | 4/2015 | Cooper | |
| 9,010,701 | B1 | 4/2015 | Cooper | |
| 9,330,646 | B2 | 5/2016 | Hennessey | |
| 9,443,496 | B1 | 9/2016 | Chiu | |
| 9,741,325 | B2 | 8/2017 | Chen | |
| 10,037,749 | B2 | 7/2018 | Glasser et al. | |
| 10,679,594 | B2 | 6/2020 | Schmidt et al. | |
| 12,020,670 | B2 * | 6/2024 | Lucksom | G10G 5/00 |

* cited by examiner

*Primary Examiner* — Kimberly R Lockett
(74) *Attorney, Agent, or Firm* — Jacob M. Ward; Ward Law Office LLC

(57) ABSTRACT

A musical instrument stand includes a base, a first cradle arm assembly rotatingly connected to the base, and a second cradle arm assembly rotatingly connected to the base. Each of the first cradle arm assembly and the second cradle arm assembly is configured to rotate with respect to the base when the musical instrument stand is in an unfolded position.

18 Claims, 13 Drawing Sheets

PORTABLE GRAVITY-GRIP MUSICAL INSTRUMENT STAND

CROSS-REFERENCE TO RELATED APPLICATIONS

This application is a continuation of U.S. application Ser. No. 17/883,804, filed on Aug. 9, 2022, which claims the benefit of U.S. Provisional Application Ser. No. 63/231,152, filed on Aug. 9, 2021. The entire disclosures of the above applications are incorporated herein by reference.

FIELD

The present invention relates generally to a musical instrument stand and, more particularly, to a portable gravity-grip musical instrument stand and a method of using a portable gravity-grip musical instrument stand.

INTRODUCTION

This section provides background information related to the present disclosure which is not necessarily prior art.

A musical instrument, especially a handheld instrument such as a guitar, often requires a musical instrument stand to keep the musical instrument safe when not in use. A musical instrument stand may also be used to display the musical instrument in a variety of settings such as homes, schools, retail stores, museums, and on stage. Musical instrument stands need to be stable and easy to set up, take down, and transport.

Known musical instrument stands come in a variety of shapes and configurations and use different means for supporting a guitar or other handheld musical instrument in an upright position. However, these musical instrument stands are often awkwardly shaped, difficult to store and transport, and not sturdy enough to effectively prevent the musical instrument from being damaged when inevitable bumps and collisions occur.

In one particular example, U.S. Pat. No. 7,105,732 teaches a musical instrument stand with a self-locking neck lock assembly for a guitar-shaped musical instrument. The musical instrument stand includes a post, multiple legs, and a self-locking neck lock assembly. However, the device is awkward in shape and difficult to store and transport. In another example, U.S. Pat. No. 9,741,325 teaches a foldable floor stand for a guitar that includes supporting rods, aluminum tubes connected to the bottom ends of the supporting rods, two plastic engagers on the supporting rods, and a rotatable pad apparatus configured to contact the guitar surface during use. However, the musical instrument stand does not effectively prevent damage to the musical instrument if and when the musical instrument is bumped from a variety of angles.

Accordingly, there is a continuing need for a musical instrument stand that is portable, compact, and easy to use, store, and transport. Desirably, the musical instrument stand would be lightweight, inexpensive to make, durable, and sturdy.

SUMMARY

In concordance with the instant disclosure, a musical instrument stand that is portable, compact, easy to use, store, and transport, lightweight, inexpensive to make, durable, and sturdy, has surprisingly been discovered.

In certain embodiments, a musical instrument stand includes a base, a first cradle arm assembly rotatingly connected to the base, and a second cradle arm assembly rotatingly connected to the base. Each of the first cradle arm assembly and the second cradle arm assembly is configured to rotate with respect to the base when the musical instrument stand is in an unfolded position.

In certain embodiments, a musical instrument stand includes a base having a first leg assembly that is rotatingly connected to a second leg assembly, a first cradle arm assembly rotatingly connected to the first leg assembly of the base, and a second cradle arm assembly rotatingly connected to the second leg assembly of the base. Each of the first cradle arm assembly and the second cradle arm assembly is configured to rotate with respect to the base when the musical instrument stand is in an unfolded, in-use position, and each of the first cradle arm assembly and the second cradle arm assembly is secured within a perimeter of the base when the musical instrument stand is in a folded position and when the musical instrument stand is in an unfolded, not-in-use position.

In certain embodiments, a method of using a musical instrument stand comprises the step of providing a musical instrument stand. The musical instrument stand includes a base, a first cradle arm assembly rotatingly connected to the base, and a second cradle arm assembly rotatingly connected to the base. Each of the first cradle arm assembly and the second cradle arm assembly is configured to rotate with respect to the base when the musical instrument stand is in an unfolded position. The method further comprises the steps of placing the musical instrument stand in the unfolded position on a surface and positioning a musical instrument on the musical instrument stand.

In an exemplary embodiment, a musical instrument stand comprises a plurality of leg units and a connected plurality of gripper units. The plurality of leg units and gripper units utilize a guitar-shaped instrument's weight to hold the musical instrument securely. When not in use, the musical instrument stand may be folded and locked into a compact shape. In certain more particular embodiments, the musical instrument stand may be folded into a compact shape that is not larger than the size of a letter-size enclosure. As one non-limiting example, the musical instrument stand may be folded into a compact shape that is not larger than ten by thirteen inches. Furthermore, all the parts may be stowed within an outer perimeter of the musical instrument stand when folded, resulting in a neat, compact shape for storage and transport.

In certain embodiments, a musical instrument stand comprises a U-shaped leg unit with two longitudinal members of equal length, connected by a transverse member. Each extremity of the leg unit has a hole such that the holes are coaxial and the axis runs parallel to the length of the transverse member. Further, each extremity of the leg unit has one of the corners rounded with a circular profile concentric to the hole, and a radius value of half the width of the leg unit. A second identical leg unit is connected to the first one, through the holes, by using pins that extend to hinge covers, such that the two leg units are aligned side to side, with the rounded corners facing each other. The leg units may rotate around the pins, away from each other, till the flat ends engage a predetermined stop built into the hinge cover. Additionally, the embodiment may include feet fabricated from material with shock absorbing properties. The feet may be mounted at the two corners of the transverse member of the leg unit.

Additionally, a gripper unit may include a swing arm with a hole near each end, another identical swing arm, a pair of V-shaped cradle arms, corresponding sleeves that wrap around the V-shaped part of the cradle arms, retaining springs, and caps for each extremity of the cradle arms. The ends of the cradle arms are bent back such that they are collinear and have holes for the retaining springs to attach to. The two swing arms are connected by inserting the ends of the cradle arms through the holes in the swing arms, creating an approximate rectangular shape. The retaining springs are installed on the ends of the cradle arms that protrude through the holes in the swing arms. The other ends of the springs are attached to the swing arm at a predetermined point such that the apexes of the cradle arm point inward towards each other.

In certain embodiments, the gripper may be centrally positioned between the longitudinal members of the leg unit and connected to the leg unit on two sides using an assembly of pins, spacers, and caps, respectively. The pivots may be located in such a way as to permit the gripper arm to swing around freely, without interference, when the leg units are open. Moreover, the pivot may not be centered on the swing arms, resulting in the cradle arm being further from the pivot to swing lower and rest on the two rubber feet, which may act as stops. The rubber feet may extend through the leg unit beyond the perimeter and function as feet when the device is placed on the floor or another suitable flat surface.

In certain embodiments, a second identical gripper unit may be attached to the other leg unit in a similar fashion, such that the complete configuration may be symmetrical across a vertical plane through the center of the hinge covers and across a perpendicular vertical plane through the center of the transverse members of the leg units. Additionally, a plurality of locks and carrier straps may be included. The locks may engage the legs and the swing arms in their closed position and prevent them from swinging out. The carrier straps may be hooked on the lock ends.

In another exemplary embodiment, a method of using the musical instrument stand includes a step of providing the musical instrument stand. The musical instrument stand may be unlocked by removing locks. Next, the legs may be pulled away from one another to the fullest extent, and the musical instrument stand may be placed on the floor or another suitably flat and stable surface. The grippers may align with the legs and assume a receptive posture. Next, a user may lower a guitar shaped musical instrument gently, body first, and oriented such that the upper cradle arms may roll and slide along the curved bottom sides, ensuring that the instrument is centered approximately between the hinges. The bottom of the musical instrument may weigh on the two upper cradle arms and swivel the arms around to engage them on the edges of the instrument's body. Lowering the instrument further may swing both of the grippers around pivot pins, all the while maintaining the upper cradle arm's grip on the instrument. Once the grippers rotate to an approximately horizontal orientation, the user may let go of the instrument gently. The lower cradle arms may rotate around their respective pivots to engage the musical instrument at the upper edges of its body. During use, the weight of the instrument forces the cradle arms to generate a firm, self-balancing hold on the instrument. Slight realignment and adjustments may be made by lifting the instrument slightly, repositioning the instrument, and letting go again. To release the instrument, the user may pick it up by the neck and lift it straight up slowly. This may cause the grippers to release their pressure and start swinging away. The musical instrument may then be lifted away cleanly. For transportation and storage, the user may push the legs together to close. Thereafter, the user may snap the locks in from the opposite sides until the locks engage successively on the legs and swing arms. The stand may then be lifted by the carry-strap.

In certain embodiments, changes in form, materials, and detail may be made within the scope of the invention. Among the changes in detail, varying methods of providing rotational movement at the joints may be used, including but not limited to damping the rotational motion. The leg unit and the swing arms may be made of a circular cross section and a different material. The upper cradle arms may be straight and the lower cradle arms may have a V-shape. The shape and orientation of the legs may be angled outwardly to provide a more stable stance during use.

In another exemplary embodiment, the musical instrument stand may include a plurality of U-shaped leg units and a plurality of grippers comprising swing arms, cradle arms, springs, and caps. The grippers may be connected rotatably within the confines of each leg unit, respectively, using pins, spacers, and caps. The leg units may be connected at the ends using hinge pins connected to hinge covers, such that they may swing open and assume a stable position when placed on a flat surface. When a guitar or similar instrument is placed on the upper cradle arms, the grippers may swing around their pivots and hold the instrument in a firm, steady grip. For storage or transportation, the leg units may fold up together, pulling the grippers into the perimeter of the leg units. Certain embodiments may also include a plurality of locks and connected straps. When the stand is not in use, the locks may snap in place over the leg units and swing arms in succession, thereby preventing the leg units from opening.

Advantageously, the musical instrument stand is compact, the parts integrate into a unified product, no assembly is required at the time of use, and every component is located within a perimeter of the leg units when the musical instrument stand is folded and not in use, thereby ensuring there are no snagging protrusions. Additionally, the compact shape of the musical instrument stand when not in use fits neatly within a box or bag and is easy to store, pack, or carry. The movement of the grippers when the instrument is placed on the stand provides animation and is interesting to observe and the upright posture of the musical instrument while on the musical instrument stand adds to the dramatic appeal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
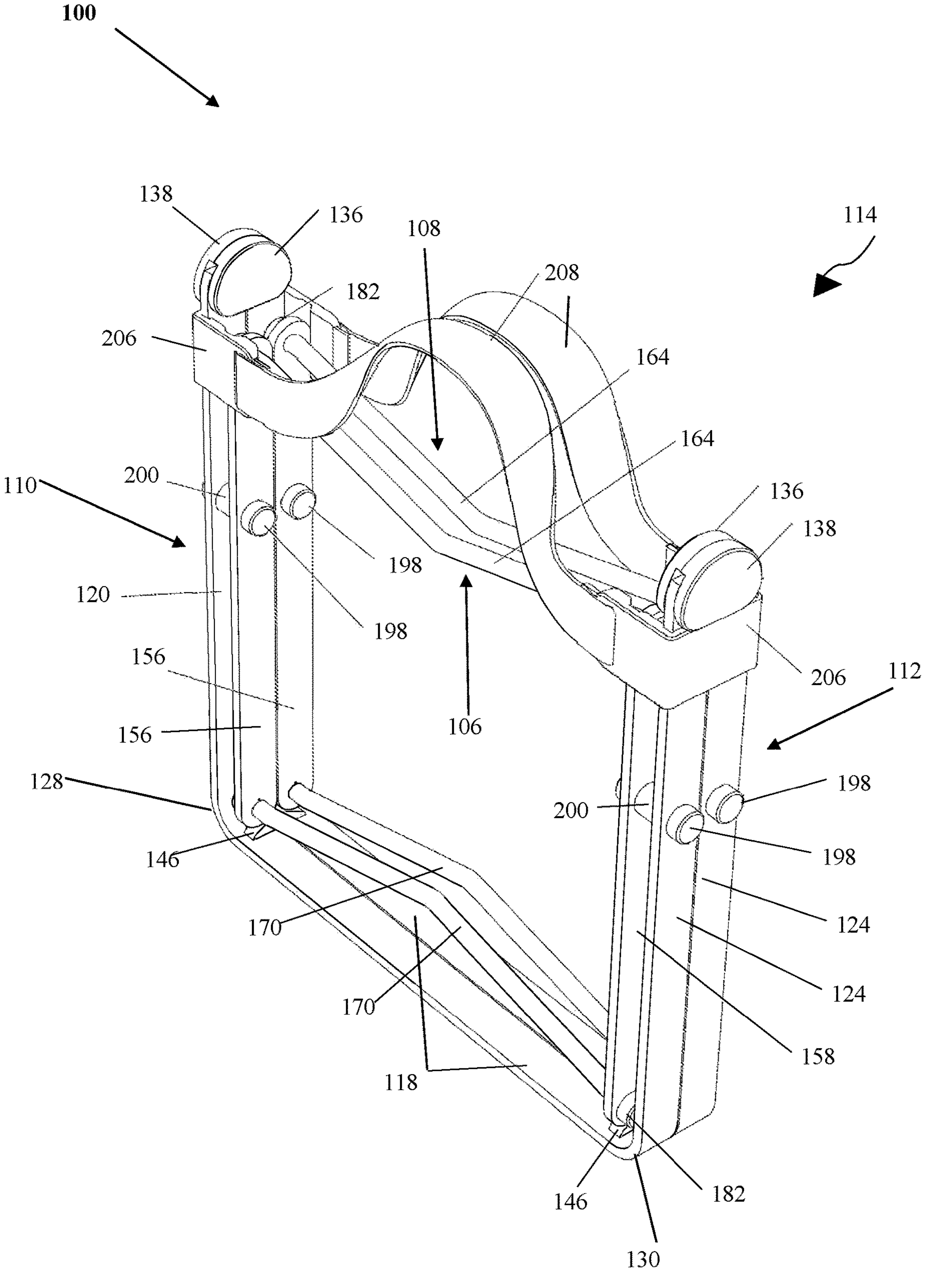
FIG. 1 is a top perspective view of a musical instrument stand in a folded position, according to an embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-12, a musical instrument stand 100 is shown. The musical instrument stand 100 may be configured to securely hold and display a musical instrument 102. As one non-limiting example, the musical instrument stand 100 may hold a guitar. The musical instrument stand 100, according to certain embodiments, may include a base 104, a first cradle arm assembly 106, and a second cradle arm assembly 108. Any suitable material or combination of materials such as metal, plastic, and wood, as non-limiting examples, may be used to fabricate the musical instrument stand 100. The musical instrument stand 100 may have any desirable shape, size, and configuration, as determined by one of skill in the art.

Figure 10:
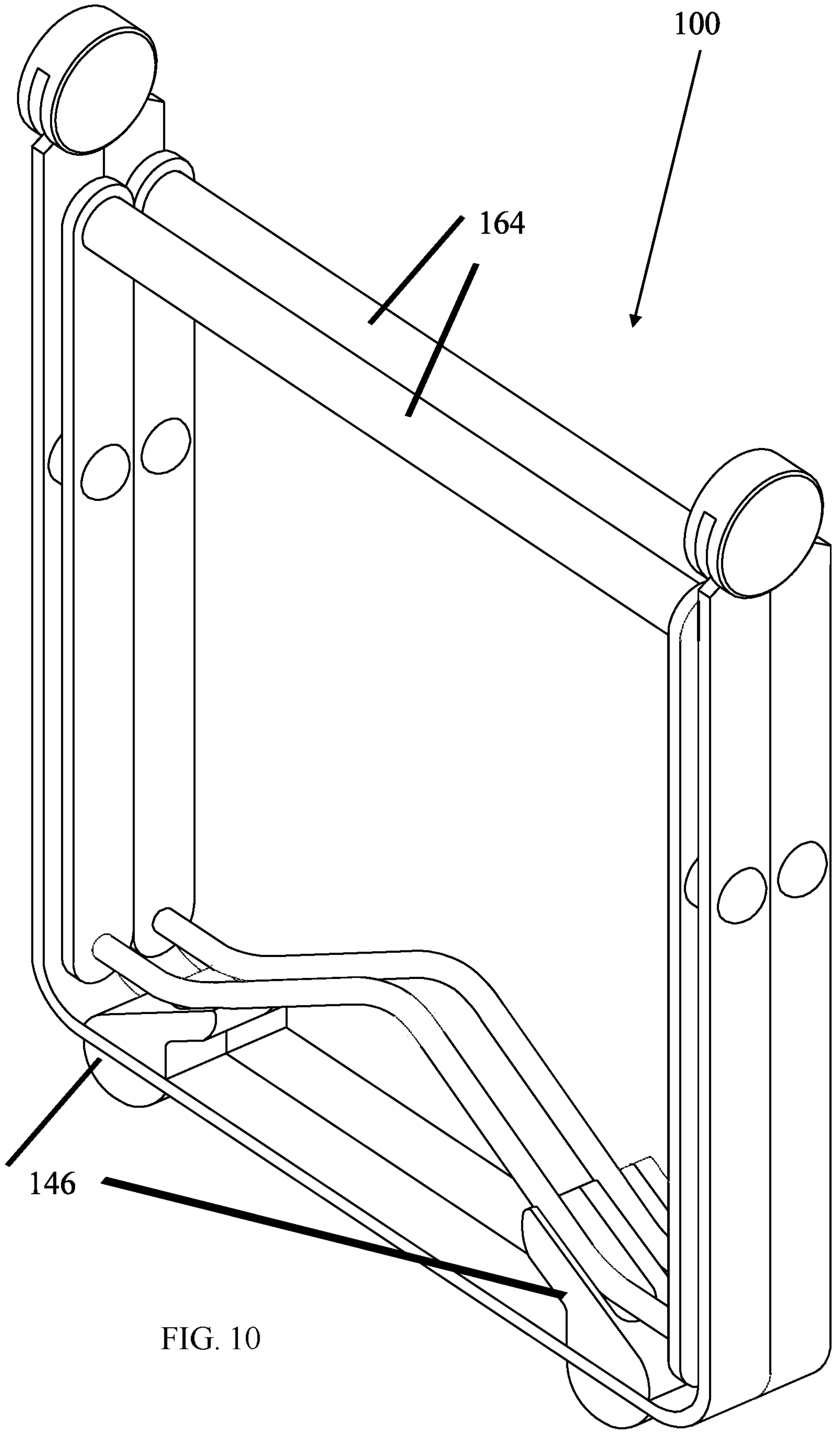
FIG. 10 is a top perspective view of a musical instrument stand in a folded position, according to a further embodiment of the present disclosure.
Figure 11:
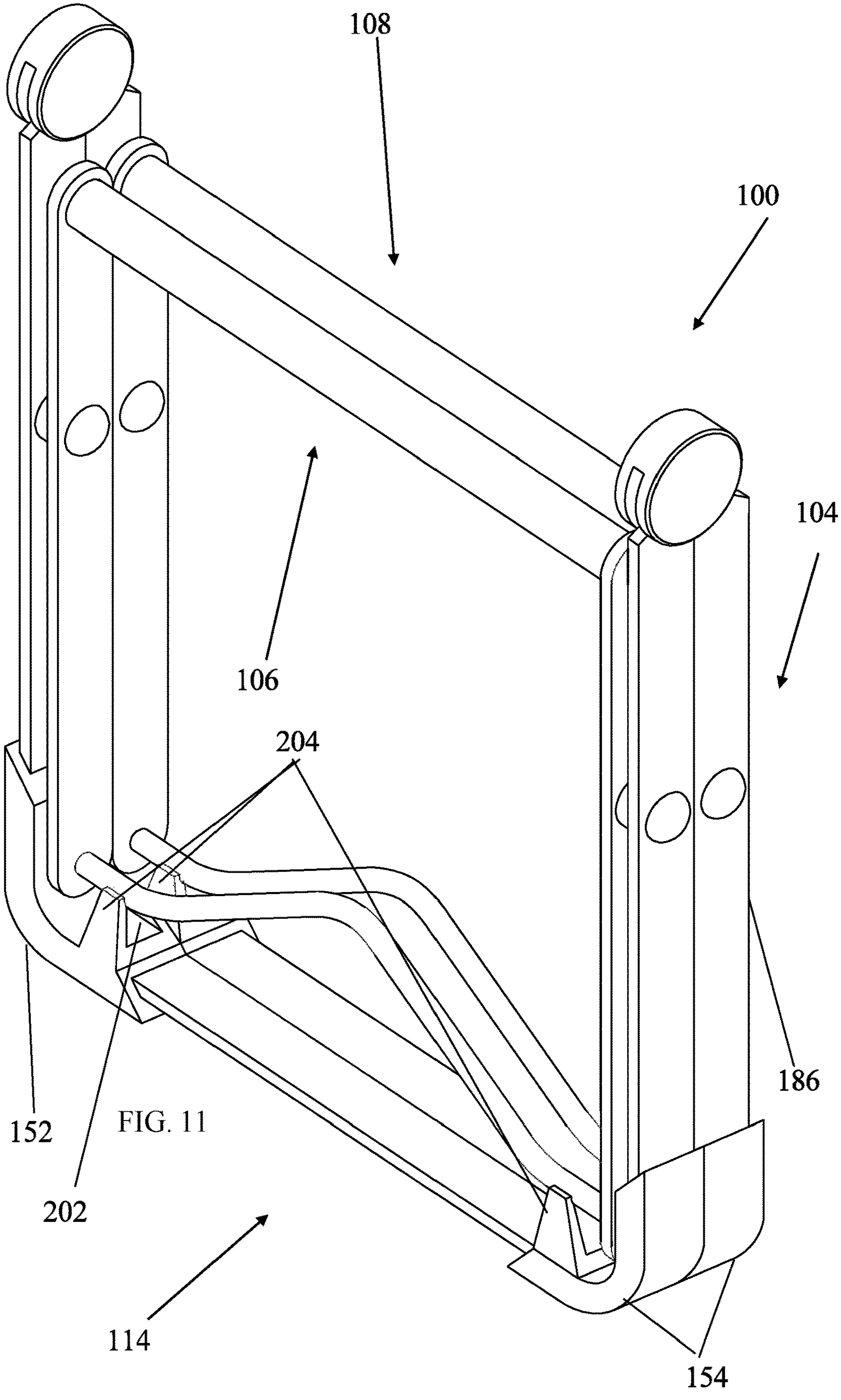
FIG. 11 is a top perspective view of a musical instrument stand in a folded position, according to a still further embodiment of the present disclosure.
Figure 12:
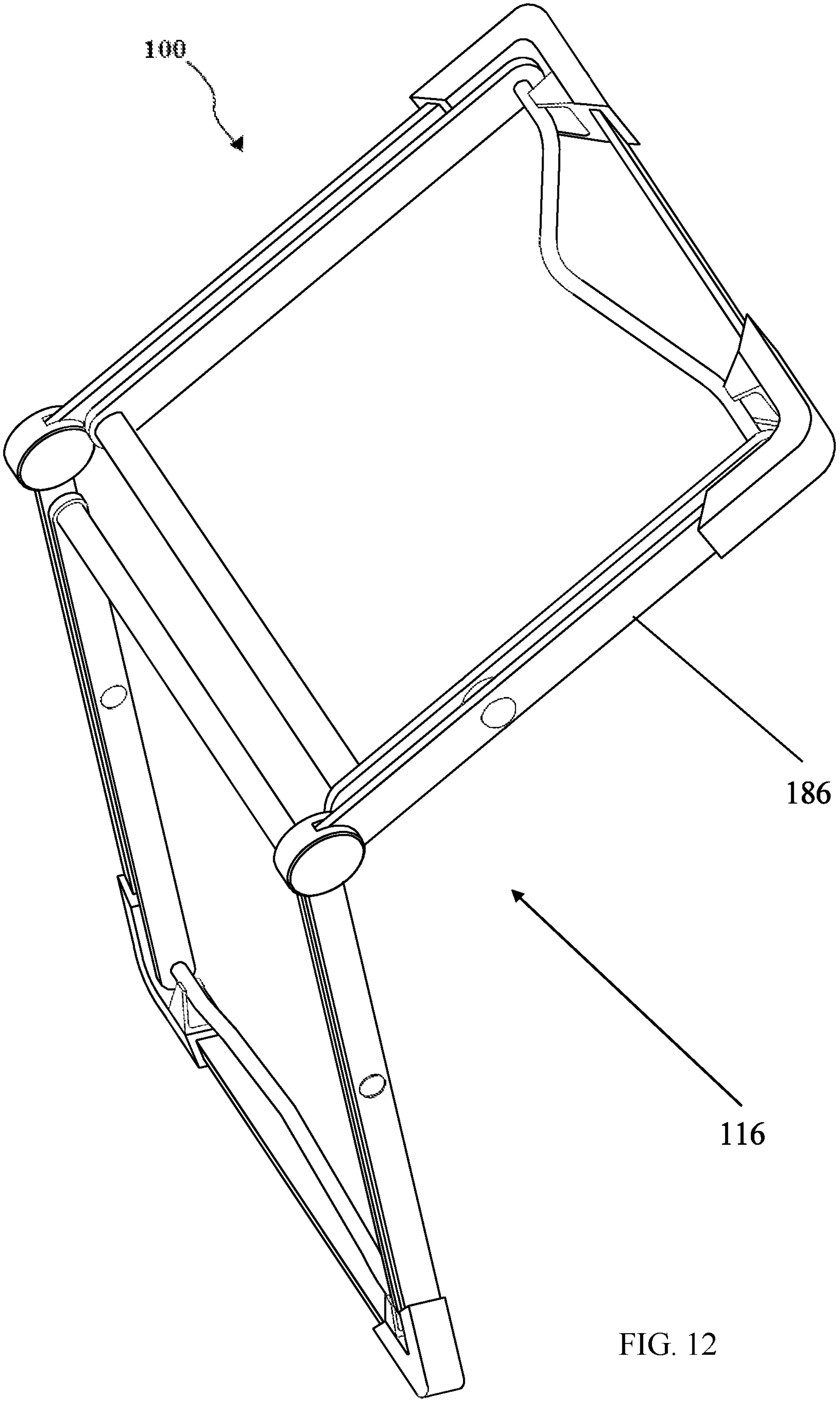
FIG. 12 is a top perspective view of the musical instrument stand of FIG. 11 shown in an unfolded position.

The base 104 may include a first leg assembly 110 and a second leg assembly 112, according to certain embodiments. The first and second leg assemblies 110, 112 may be configured to rotate with respect to one another between a folded position 114, as shown in FIGS. 1, 2, 7, and 8-11, and an unfolded position 116, as shown in FIGS. 3, 4, and 12, and may be integral with one another or permanently or removably connected to one another. A skilled artisan may employ any suitable shape, size, and configuration for each of the first and second leg assemblies 110, 112. The first and second leg assemblies 110, 112 may be identical to one another or different from one another, as determined by one of skill in the art.

The base 104 may solid, hollow, or a combination of solid and hollow. In certain embodiments, one or more pads or protective sleeves (not shown) may be disposed on or around the first and second leg assemblies 110, 112 or integral with the first and second leg assemblies 110, 112. In certain embodiments, the base 104 may be smooth and devoid of sharp angles and protrusions.

Figure 9:
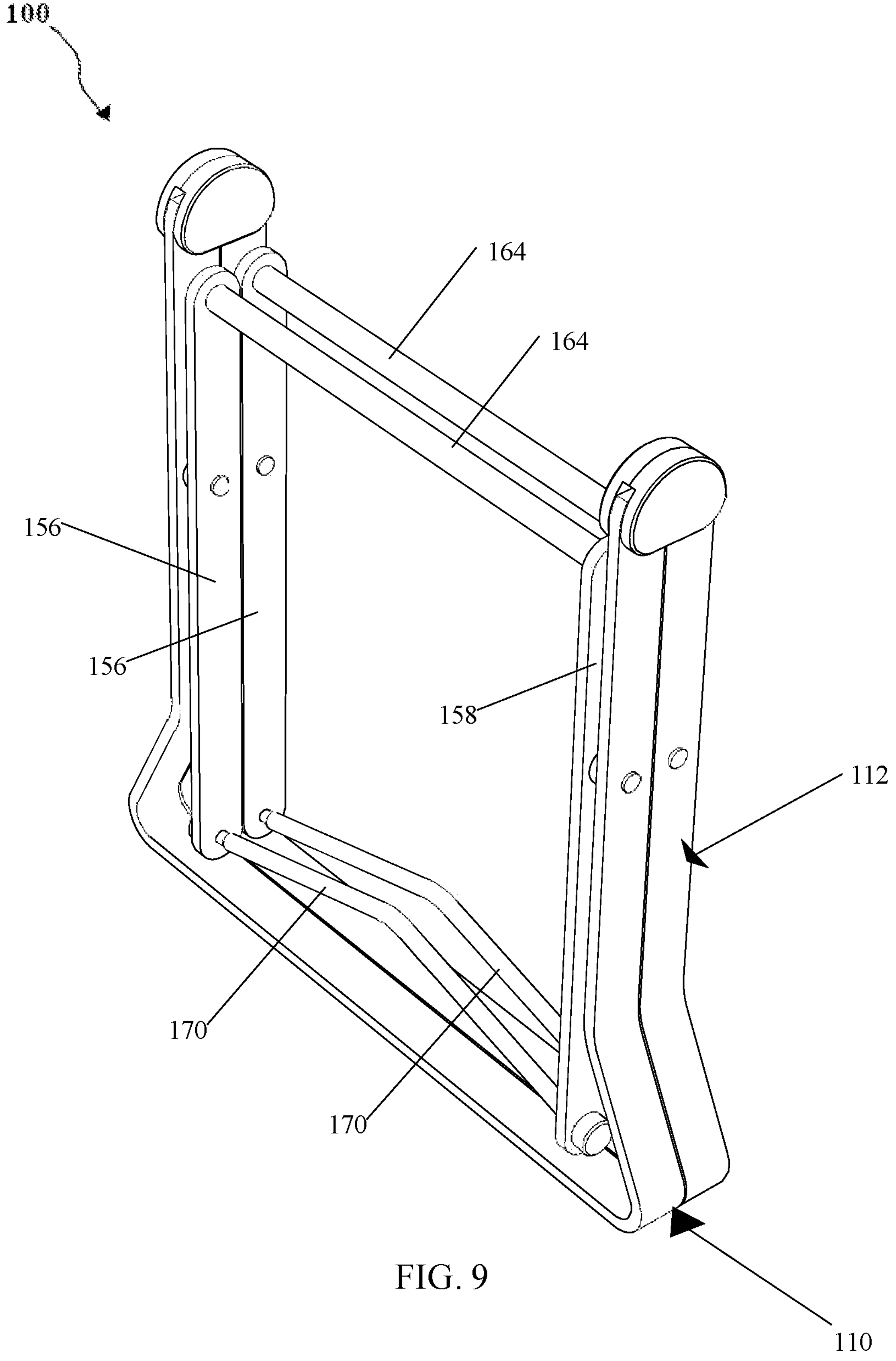
FIG. 9 is a top perspective view of a musical instrument stand in a folded position, according to yet another embodiment of the present disclosure.

Each of the first and second leg assemblies 110, 112 may be generally U-shaped, according to certain more particular embodiments, and may include a transverse member 118 connected to a first longitudinal member 120 at a first end 122 of the first longitudinal member 120 and a second longitudinal member 124 at a first end 126 of the second longitudinal member 124. According to certain embodiments, the transverse member 118 and the first and second longitudinal members 120, 124 may be integral with one another or permanently or removably connected to one another. Each of the first and second leg assemblies 110, 112 may include a first corner section 128 and a second corner section 130. In certain embodiments, the first and second corner sections 128, 130 may have a rounded shape. In certain more particular embodiments, one or both of the first and second longitudinal members 120, 124 may extend outwardly at each of the first ends 122, 126 of the first and second longitudinal members 120, 124, as shown in FIG. 9, and configured to improve stability of the base 104.

The first leg assembly 110 and the second leg assembly 112 may be rotatingly connected to one another using one or more pins 132, according to certain embodiments. It should be appreciated that any suitable connecting means may be used to rotatingly connect the first leg assembly 110 and the second leg assembly 112 such as hinge connectors, as one non-limiting example. In certain embodiments, a first connecting means (not shown) extending through or disposed around the first longitudinal member 120 of the first leg assembly 110 and the first longitudinal member 120 of the second leg assembly 112, and a second connecting means (not shown) extending through or disposed around the second longitudinal member 124 of the first leg assembly 110 and the second longitudinal member 124 of the second leg assembly 112 may be used to rotatingly connect the first and second leg assemblies 110, 112 to one another. It should be appreciated that any suitable connecting means may be used to rotatingly connect the first leg assembly 110 and the second leg assembly 112 to one another such that the first and second leg assemblies 110, 112 may rotate with respect to one another between the folded position 114 and the unfolded position 116.

Figure 2:
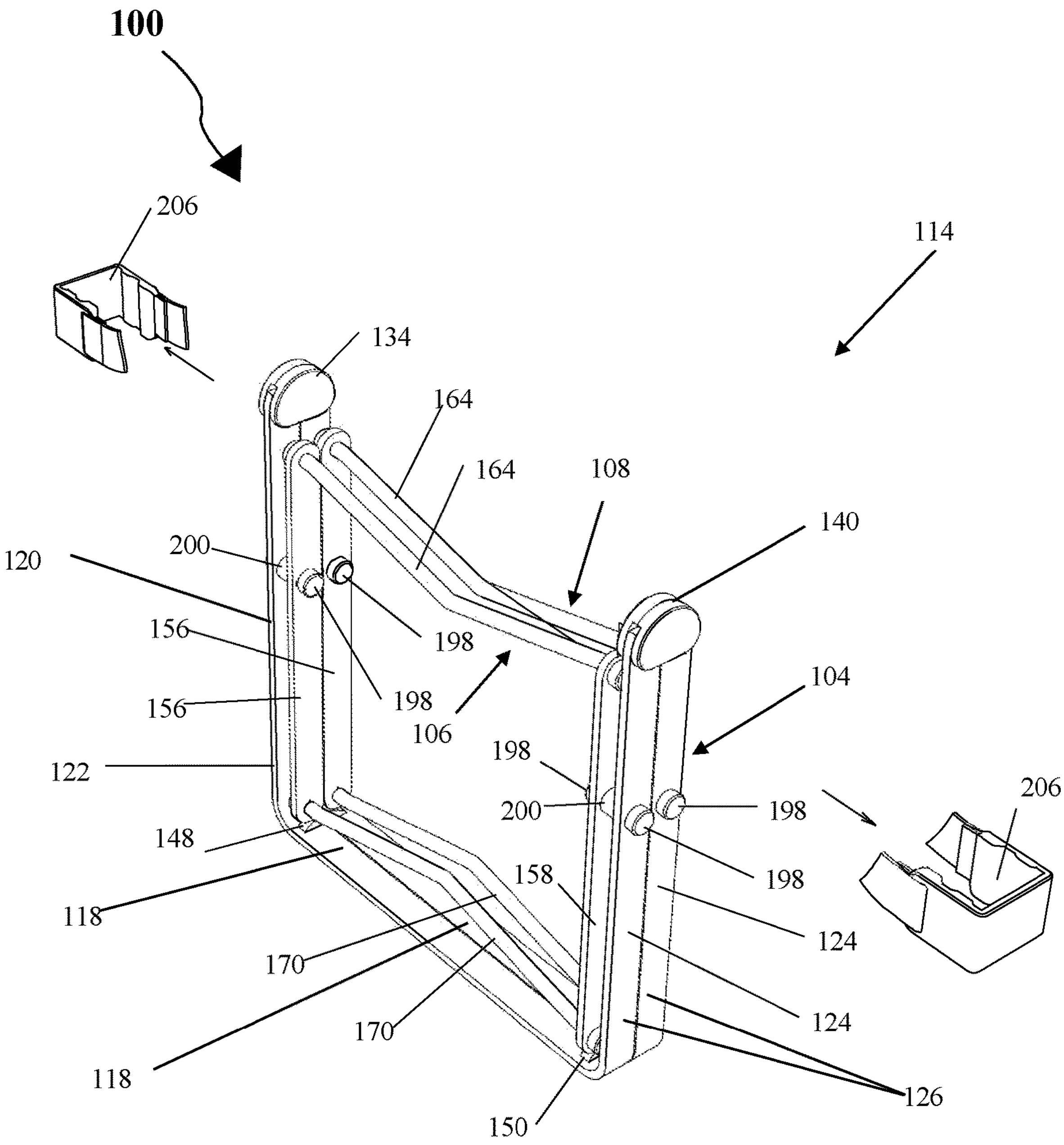
FIG. 2 is a top perspective view of the musical instrument stand of FIG. 1 shown with the locks disengaged and the strap removed.
Figure 3:
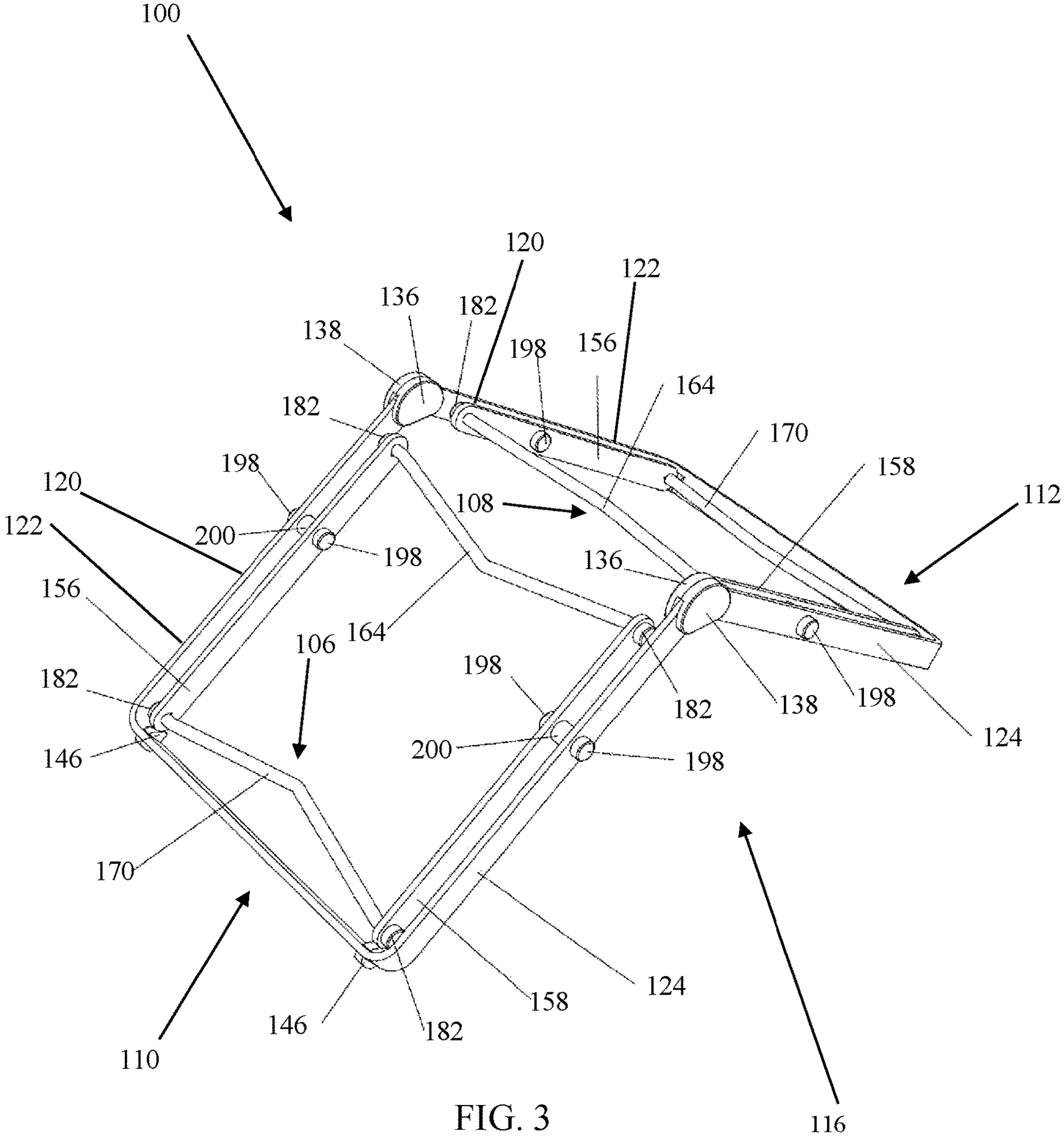
FIG. 3 is a top perspective view of the musical instrument stand of FIG. 1 shown in an unfolded position.
Figure 6:
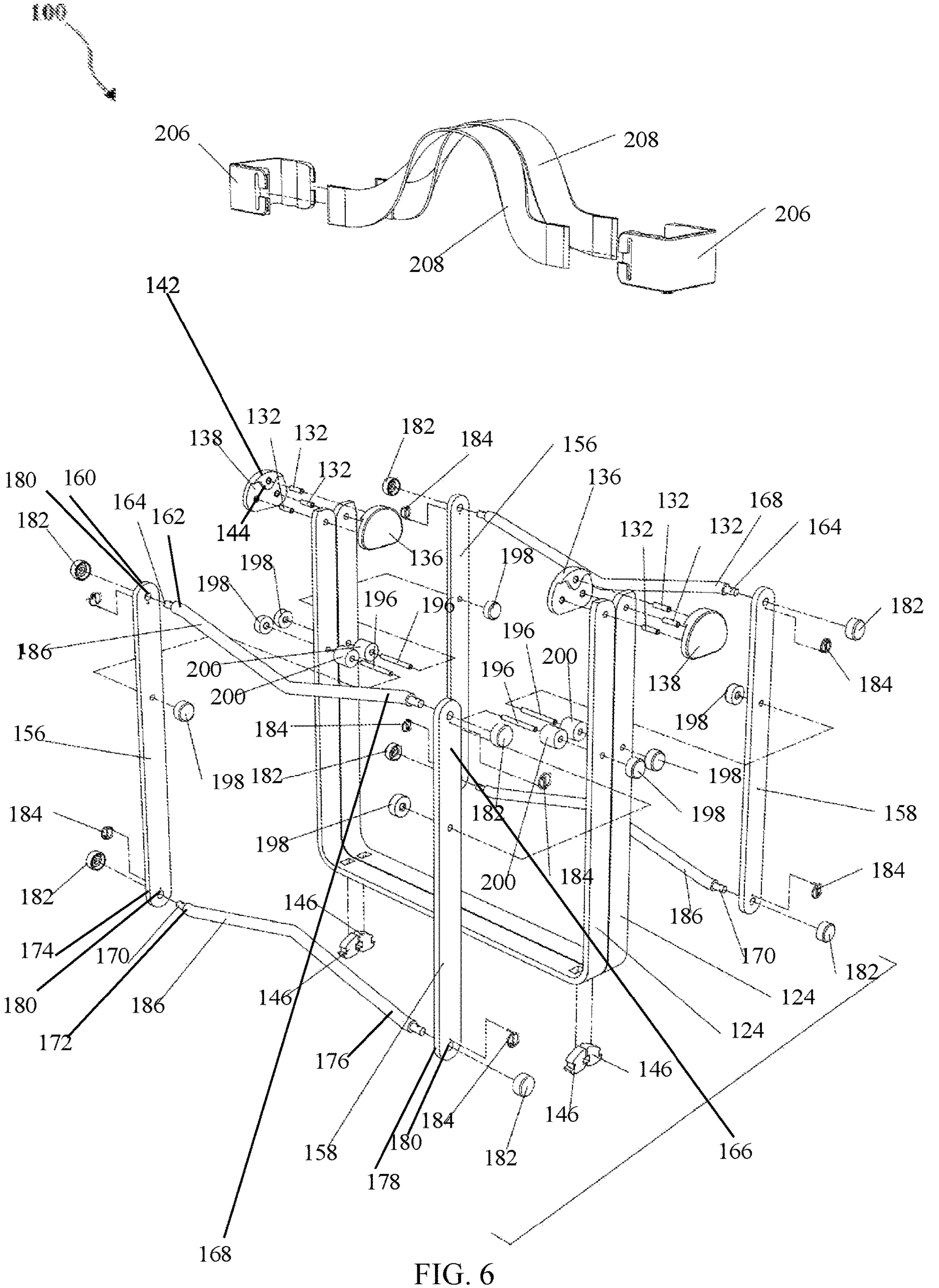
FIG. 6 is an exploded top perspective view of the musical instrument stand of FIG. 1.

In a more particular embodiment, as shown in FIGS. 2 and 6, pins 132 may be used in combination with a first hinge cover 134 having an inner hinge plate 136 and an outer hinge plate 138 to connect the first longitudinal member 120 of the first leg assembly 110 and the first longitudinal member 120 of the second leg assembly 112 to one another. A second hinge cover 140 having an inner hinge plate 136 and an outer hinge plate 138 may be used in combination with the pins 132 to connect the second longitudinal member 124 of the first leg assembly 110 and the second longitudinal member 124 of the second leg assembly 112 to one another. It should be appreciated that any connecting means or combination of connecting means may be used to rotatingly connect the first and second leg assemblies 110, 112 to one another.

In certain embodiments, as shown in FIG. 6, a leg assembly locking mechanism 142 may be used to secure the first and second leg assemblies 110, 112 in one or both of the folded position 114 and the unfolded position 116. The leg assembly locking mechanism 142 may be integral with one or both of the first and second leg assemblies 110, 112 or may be an additional component permanently or removably connected to one or both of the first and second leg assemblies 110, 112. In one more particular embodiment, a leg locking ridge 144 may be integrally formed on or in one or both of the first and second hinge covers 134, 140 and configured to lock each of the first and second leg assemblies 110, 112 in the unfolded position 116. It should be appreciated that any suitable locking mechanism may be employed to lock the first and second leg assemblies 110, 112 with respect to one another in one or both of the folded position 114 and the unfolded position 116, as determined by one of skill in the art.

In certain embodiments, a foot component 146 may be connected to the base 104 of the musical instrument stand 100 and configured to protect the musical instrument stand 100 and a surface (not shown) on which the musical instrument stand 100 is placed. The foot component 146 may be disposed on or around the transverse member 118 of each of the first and second leg assemblies 110, 112, in certain embodiments. Alternatively, the foot component 146 may be integral with the base 104 of the musical instrument stand 100. In certain embodiments, more than one foot component 146 may be included on the base 104, as shown in FIGS. 1-6, 8, and 10. As one non-limiting example, a first foot component 148 may be placed adjacent the first corner section 128 of each of the first and second leg assemblies 110, 112, and a second foot component 150 may be placed adjacent the second corner section 130 of each of the first and second leg assemblies 110, 112. In certain embodiments, as shown in FIG. 11, a first corner foot component 152 may be disposed on or around the first corner section 128 of each of the first and second leg assemblies 110, 112, and a second corner foot component 154 may be disposed on or around the second corner section 130 of each of the first and second leg assemblies 110, 112. Any suitable shock absorbing material or combination of materials may be used to fabricate the foot component 146, such as silicon and rubber, as non-limiting examples.

With particular reference to FIG. 6, each of the first and second cradle arm assemblies 106, 108 may include a first swing arm 156 and a second swing arm 158 positioned parallel to the first swing arm 156. The first swing arm 156 may have a first end 160 connected to a first end 162 of a first support member 164 and the second swing arm 158 may have a first end 166 connected to a second end 168 of the first support member 164. A second support member 170 may have a first end 172 connected to a second end 174 of the first swing arm 160 and a second end 176 connected to a second end 178 of the second swing arm 158. The first and second swing arms 156, 158 and the first and second support members 164, 170 may be integral with one another or permanently or removably connected to one another, as determined by one of skill in the art.

In certain embodiments, one or both of the first and second support members 164, 170 of the first cradle arm assembly 106 may be configured to rotate with respect to the first and second swing arms 156, 158 of the first cradle arm assembly 106. In a more particular embodiment, as shown in FIG. 6, the first end 162 of the first support member 164 may extend through an opening 180 disposed in the first end 160 of the first swing arm 156 of the first cradle arm assembly 106, and the second end 168 of the first support member 164 may extend through an opening 180 disposed in the first end 166 of the second swing arm 158 of the first cradle arm assembly 106.

Figure 4B:
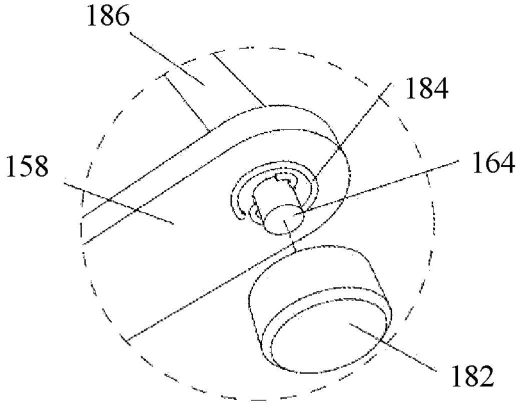
FIG. 4B is an enlarged view of a pin, a spring, and a cap called out in FIG. 4A.

Likewise, the first end 172 of the second support member 170 may extend through an opening 180 disposed in the second end 174 of the first swing arm 158 of the first cradle arm assembly 106, and the second end 176 of the second support member 170 may extend through an opening 180 disposed in the second end 178 of the second swing arm 158 of the first cradle arm assembly 106. A support member securing mechanism 182, as shown in FIGS. 4B and 6, may be used to rotatably secure each of the first and second support members 164, 170 to each of the first and second swing arms 156, 158 of the first cradle arm assembly 106. A skilled artisan may select any suitable connecting means for rotatably connecting one or both of the first and second support members 164, 170 to the first and second swing arms 156, 158 of the first cradle arm assembly 106. In a more particular embodiment, one or more support member springs 184 may be configured to apply a rotational force to one or more of the first and second support members 164, 170 when one or more of the first and second support members 164, 170 rotates with respect to the first and second swing arms 156, 158 of the first cradle arm assembly 106. It should be appreciated that a skilled artisan may employ any suitable spring, plurality of springs, or other suitable means positioned in or on one or both of the first and second support members 164, 170 and the first and second swing arms 156, 158 of the first cradle arm assembly 106 to apply a rotational force to one or both of the first and second support members 164, 170, as desired.

In certain embodiments, one or both of the first and second support members 164, 170 of the second cradle arm assembly 108 may be configured to rotate with respect to the first and second swing arms 156, 158 of the second cradle arm assembly 108. In a more particular embodiment, as shown in FIG. 6, the first end 162 of the first support member 164 may extend through an opening 180 disposed in the first end 160 of the first swing arm 156 of the second cradle arm assembly 108, and the second end 168 of the first support member 164 may extend through an opening 180 disposed in the first end 166 of the second swing arm 158 of the second cradle arm assembly 108. Likewise, the first end 172 of the second support member 170 may extend through an opening 180 disposed in the second end 174 of the first swing arm 156 of the second cradle arm assembly 108, and the second end 176 of the second support member 170 may extend through an opening 180 disposed in the second end 178 of the second swing arm 158 of the second cradle arm assembly 108. The support member securing mechanism 182 may be used to rotatably secure each of the first and second support members 164, 170 to each of the first and second swing arms 156, 158 of the second cradle arm assembly 108. A skilled artisan may select any suitable connecting means for rotatably connecting one or both of the first and second support members 164, 170 to the first and second swing arms 156, 158 of the second cradle arm assembly 108. In a more particular embodiment, as shown in FIGS. 4B and 6, one or more support member springs 184 may be configured to apply a rotational force to one or more of the first and second support members 164, 170 when one or more of the first and second support members 164, 170 rotates with respect to the first and second swing arms 156, 158 of the second cradle arm assembly 108. It should be appreciated that a skilled artisan may employ any suitable spring, plurality of springs, or other suitable means positioned in or on one or both of the first and second support members 164, 170 and the first and second swing arms 156, 158 of the second cradle arm assembly 108 to apply a rotational force to one or both of the first and second support members 164, 170, as desired.

Any suitable material or combination of materials such as metal, plastic, and wood, as non-limiting examples, may be used to fabricate the first and second cradle arm assemblies 106, 108. The first and second cradle arm assemblies 106, 108 may have any desirable shape, size, and configuration, as determined by one of skill in the art. The first and second cradle arm assemblies 106, 108 may be identical to one another or different from one another, according to various embodiments. Each of the first and second swing arms 156, 158 and the first and second support members 164, 170 may be solid, hollow, or a combination of solid and hollow, as determined by a skilled artisan.

In certain embodiments, a protective element 186 such as a pad or sleeve, as non-limiting examples, may be permanently or removably disposed on or around one or both of the first and second cradle arm assemblies 106, 108 or may be integral with one or both of the first and second cradle arm assemblies 106, 108, as shown in FIG. 6. The protective element 186 may be configured to provide padding adjacent the musical instrument 102 when the musical instrument 102 is positioned in the musical instrument stand 100. In certain embodiments, the first and second cradle arm assemblies 106, 108 may be smooth and devoid of sharp angles, rough textures, and overhanging and protruding elements. In a more particular embodiment, each of the first and second support members 164, 170 of the first cradle arm assembly 106 and each of the first and second support members 164, 170 of the second cradle arm assembly 108 may include one or more protective elements 186. A skilled artisan may select any suitable soft, shock-absorbing material or combination of materials to fabricate the protective element 186.

In certain embodiments, each of the first and second cradle arm assemblies 106, 108 may have a generally rectangular shape configured to fit within a perimeter of the base 104 when the base 104 is in one or both of the folded position 114 and the unfolded position 116 and when the musical instrument stand 100 is not housing a musical instrument 102, as shown in FIGS. 1, 2, 3, 7A, and 7B. According to certain embodiments, the perimeter of the base 104 may be defined by one or both of the first and second leg assemblies 110, 112 in either the folded position 114 or the unfolded position 116. The first cradle arm assembly 106 may be configured to fit adjacent an inner surface 188 of the first leg assembly 110, and the second cradle arm assembly 108 may be configured to fit adjacent an inner surface 190 of the second leg assembly 112. The inner surface 188 of the first leg assembly 110 and the inner surface 190 of the second leg assembly 112 are shown in the unfolded position 116 in FIG. 5.

In certain embodiments, one or more of each of the first and second support members 164, 170 of the first and second cradle arm assemblies 106, 108 may have a V-shape, as shown in FIGS. 1-6. Each of the V-shaped first and second support members 164, 170 may be configured to hold the musical instrument 102 more securely in place and prevent the musical instrument 102 from moving forward, backward, and side-to-side with respect to the base 104 of the musical instrument stand 100. It should be appreciated that a skilled artisan may employ any suitable shape capable of militating against unintended forward, backward, and side-to-side motion of the musical instrument 102, as desired, for each of the first and second support members 164, 170 of each of the first and second cradle arm assemblies 106, 108, such as curved, V-shaped, or U-shaped, as non-limiting examples.

Figure 7A:
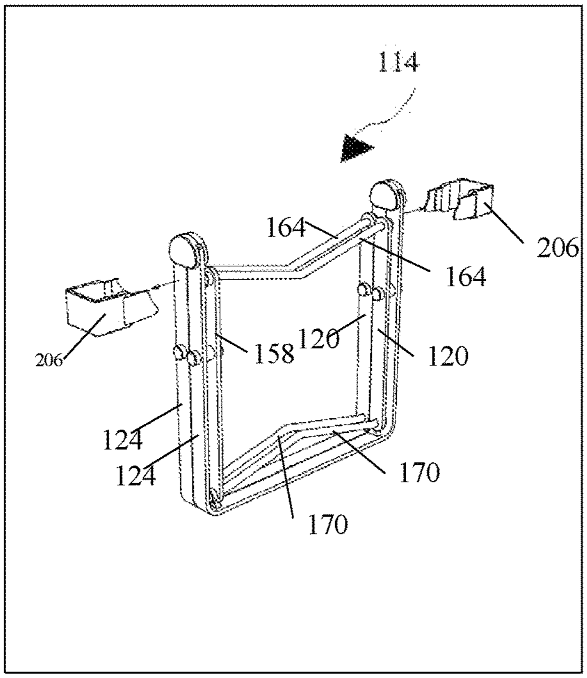
FIG. 7A is a top perspective view of the musical instrument stand of FIG. 1 shown with the locks disengaged and the strap removed.
Figure 7B:
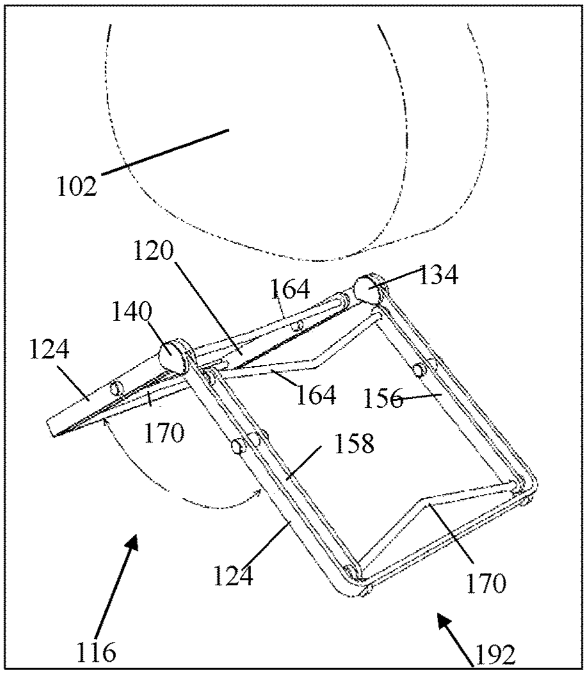
FIG. 7B is a top perspective view of the musical instrument stand of FIG. 1 shown in an unfolded position.
Figure 7C:
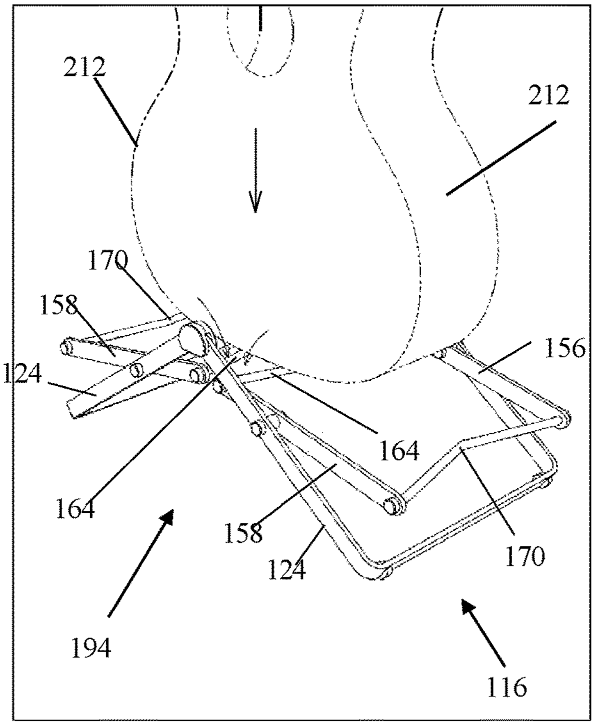
FIG. 7C is a top perspective view of the musical instrument stand of FIG. 1 shown as a musical instrument is placed therein.
Figure 7D:
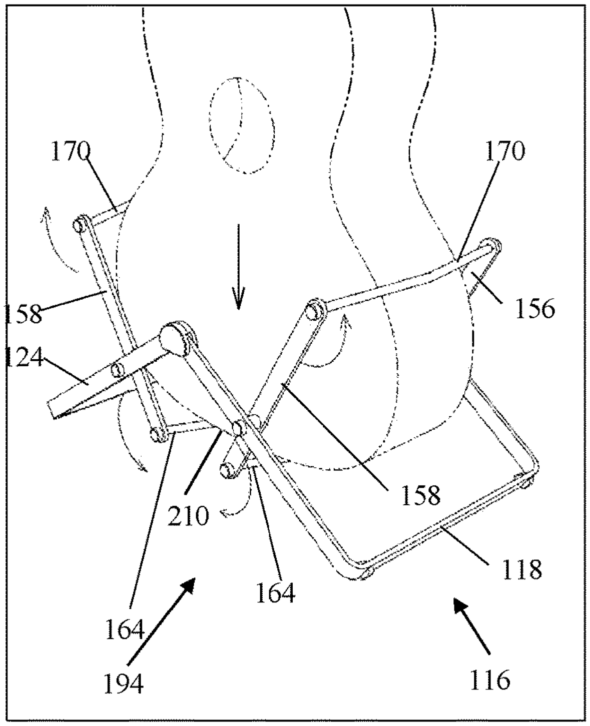
FIG. 7D is a top perspective view of the musical instrument stand of FIG. 1 shown in use, supporting the musical instrument.
Figure 8:
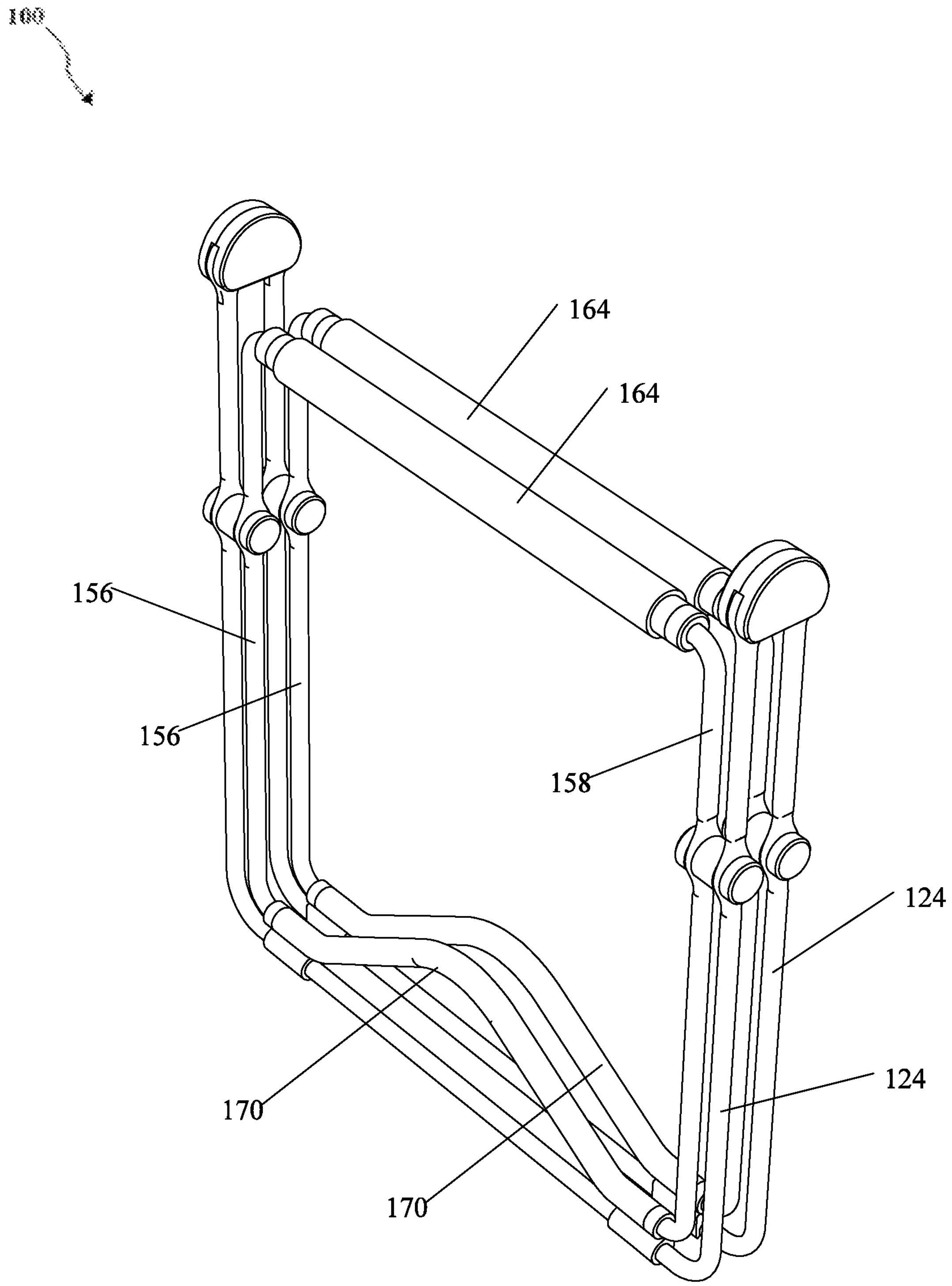
FIG. 8 is a top perspective view of a musical instrument stand in a folded position, according to another embodiment of the present disclosure.

The first and second cradle arm assemblies 106, 108 may be configured to rotate with respect to the first and second leg assemblies 110, 112 from an unfolded, not-in-use position 192 where the first and second cradle arm assemblies 106, 108 are positioned within the perimeter of the base 104 and the base 104 is in the unfolded position 116, as shown in FIG. 7B, to an unfolded, in-use position 194, as shown in the transition by FIGS. 7C and 7D, where the musical instrument stand 100 is in the unfolded position 116 and the musical instrument 102 is inserted into the musical instrument stand 100 thereby rotating each of the first and second cradle arm assemblies 106, 108. In certain embodiments, one or more cradle arm pins 196 may be used to rotatingly connect each of the first and second cradle arm assemblies 106, 108 to the base 104, as shown in FIG. 6. It should be appreciated that any suitable connecting means may be used to rotatingly connect each of the first and second cradle arm assemblies 106, 108 to the base 104, as determined by one of skill in the art. It should be further appreciated that in certain embodiments the musical instrument stand 100 may include at least one rotary damper (not shown).

Figure 4A:
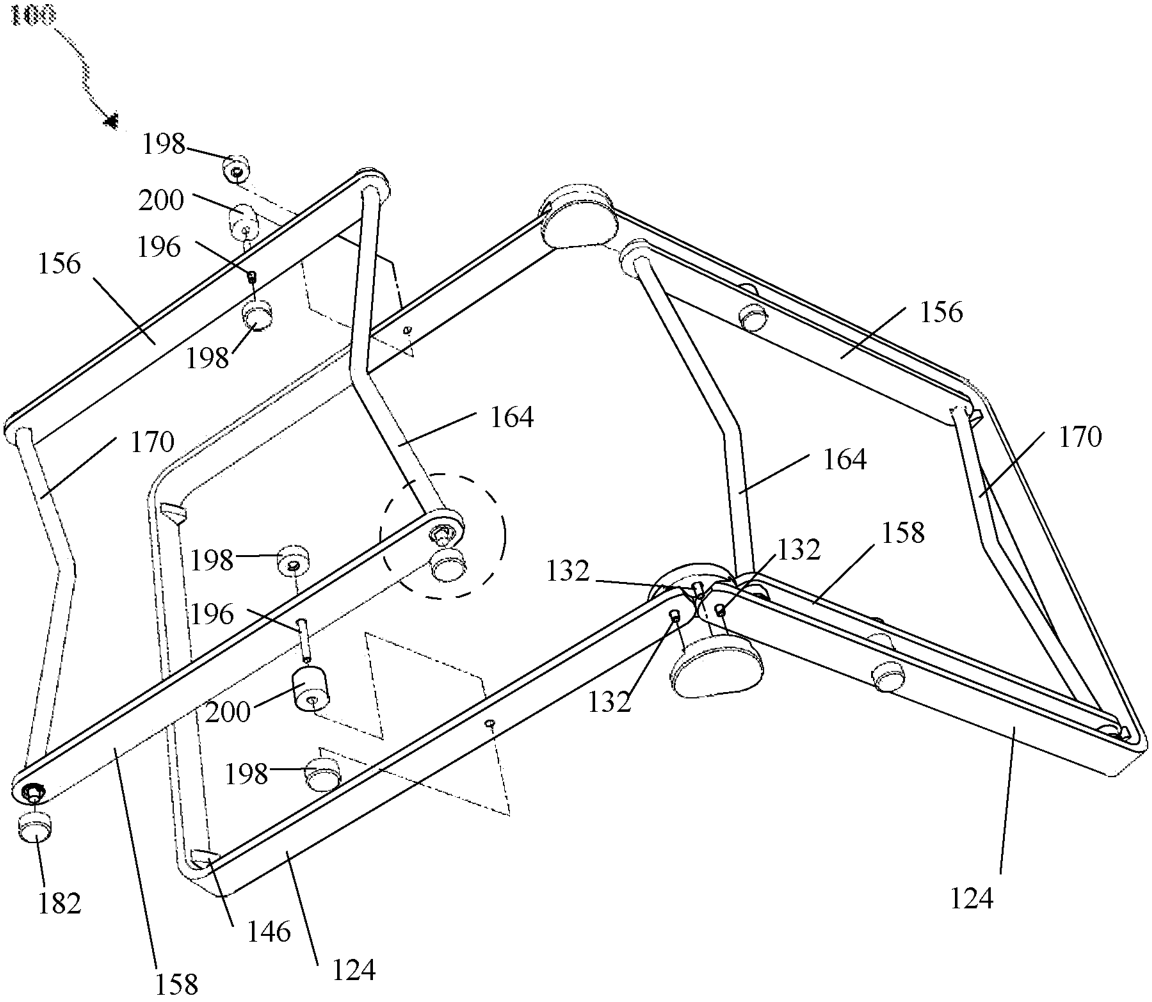
FIG. 4A is a top perspective, partially exploded view of the musical instrument stand of FIG. 1.
Figure 5:
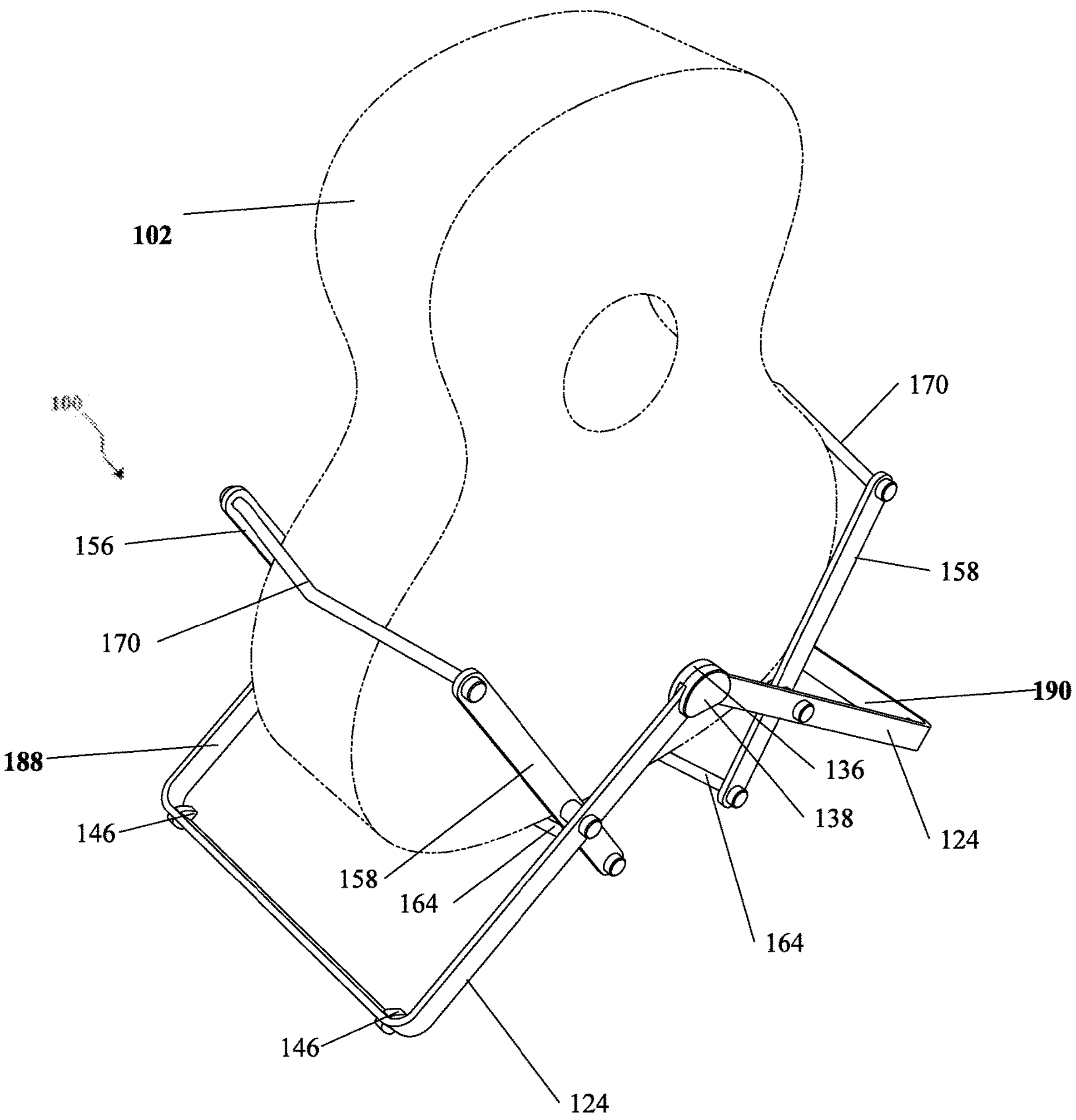
FIG. 5 is a top perspective view of the musical instrument stand of FIG. 1 shown in use.

In certain embodiments, as shown in FIGS. 4A and 6, one or more cradle arm caps 198 and one or more cradle arm spacers 200 may be used in combination with the cradle arm pins 196, as desired, to secure the cradle arm pins 196 in place and position each of the first and second cradle arm assemblies 106, 108 at a desired distance from each of the first and second leg assemblies 110, 112, respectively. A skilled artisan may employ any suitable means for securing each of the first and second cradle arm assemblies 106, 108 to the base 104 and for positioning each of the first and second cradle arm assemblies 106, 108 at a desired distance from the base 104. In certain embodiments, one or more cradle arm return springs (not shown) may be disposed on or in one or both of the base 104 and each of the first and second cradle arm assemblies 106, 108 and configured to automatically return one or both of the first and second cradle arm assemblies 106, 108 to the unfolded, not-in-use position 192 upon removal of the musical instrument 102 from the musical instrument stand 100.

In a more particular embodiment, the one or more cradle arm pins 196 may be disposed on or in the first and second swing arms 156, 158 of each of the first and second cradle arm assemblies 106, 108 at the first ends 160, 166 of the first and second swing arms 156, 158 such that when the musical instrument 102 is positioned in the musical instrument stand 100, the second ends 174, 178 of the first and second swing arms 156, 158 of each of the first and second cradle arm assemblies 106, 108 rotate a greater distance than the first ends 160, 166 of the first and second swing arms 156, 158 of each of the first and second cradle arm assemblies 106, 108.

In certain embodiments, as shown in FIG. 11, one or both of the first and second cradle arm assemblies 106, 108 may be configured to engage with a cradle arm assembly locking mechanism 202 disposed on the base 104 of the musical instrument stand 100. The cradle arm assembly locking mechanism 202 may be configured to secure one or both of the first and second cradle arm assemblies 106, 108 in place with respect to the base 104 when the musical instrument stand 100 is in the folded position 114 and the unfolded position 116 when the musical instrument stand 100 is also in the unfolded, not-in-use position 192. In a more particular embodiment, the cradle arm assembly locking mechanism 202 may be integral with the foot component 146 or the first and second corner foot components 152, 154, as shown in FIGS. 10 and 11. As one non-limiting example, the cradle arm assembly locking mechanism 202 may include one or more foot protrusions 204 extending upwardly from the foot component 146 or the first and second corner foot components 152, 154.

A musical instrument stand locking mechanism 206, as shown in FIGS. 1-2, 6 and 7A, may be used to secure the first and second leg assemblies 110, 112 and the first and second cradle arm assemblies 106, 108 adjacent to one another in the folded position 114 when the musical instrument 100 stand is being transported or stored. The musical instrument stand locking mechanism 206 may be integral with the musical instrument stand 100 or may be a separate component that is permanently or removably connected to the musical instrument stand 100.

In a more particular embodiment, one or more musical instrument stand locking mechanisms 206 may be removably disposed on or around one or more of the first and second longitudinal members 120, 124, of the first and second leg assemblies 110, 112, thereby securing the musical instrument stand 100 in the folded position 114 when the musical instrument stand 100 is ready for storage or transport. It should be appreciated that any suitable locking mechanism may be used, such as clips or straps, as non-limiting examples, as determined by one of skill in the art.

A strap 208 or any other suitable means for lifting and carrying the musical instrument stand 100 may be connected the musical instrument stand 100, according to certain embodiments. The strap 208 may be integral with or permanently or removably connected to the musical instrument stand 100, according to various embodiments. A skilled artisan may employ any suitable material or combination of materials for the strap 208, and the strap 208 may have any suitable size, shape, and configuration. In certain embodiments, the strap 208 may connect to the musical instrument stand locking mechanism 206 or may be integral with the musical instrument stand locking mechanism 206. According to certain embodiments, a musical instrument stand cover or bag (not shown) may be included with the musical instrument stand 100.

In use, a user may remove the strap 208 and the musical instrument stand locking mechanism 206, as needed, while the musical instrument stand 100 is in the folded position 114, as shown in FIG. 7A. The user may then rotate each of the first and second leg assemblies 110, 112 and position the base 104 of the musical instrument stand 100 in the unfolded, not-in-use position 192 on a desired surface, as shown in FIG. 7B. In certain embodiments, the user may engage the leg assembly locking mechanism 142 to secure each of the first and second leg assemblies 110, 112 in the unfolded position 116. Additionally, the user may remove or uncouple each of the first and second cradle arm assemblies 106, 108 from the cradle arm assembly locking mechanisms 202, as needed, such that the first and second cradle arm assemblies 106, 108 may rotate freely with respect to the base 104 in the unfolded, in-use position 194.

The user may then select the musical instrument 102 to be displayed or positioned in the musical instrument stand 100 and place a base wall 210 of the musical instrument 102 against each of the first support member 164 of the first cradle arm assembly 106 and the first support member 164 of the second cradle arm assembly 108. A weight of the musical instrument 102 may be utilized to push down on the first support members 164 of each of the first and second cradle arm assemblies 106, 108, thereby causing the first and second swing arms 156, 158 of the first and second cradle arm assemblies 106, 108 to rotate with respect to the base 104 of the musical instrument stand 100. Accordingly, insertion of the musical instrument 102 in the musical instrument stand 100 causes the musical instrument 102 stand to adjust from the unfolded, not-in-use position 192 to the unfolded, in-use position 194, as shown in the transitions depicted in FIGS. 7B, 7C, and 7D.

Upon completion of the rotation of each of the first and second swing arms 156, 158 of each of the first and second cradle arm assemblies 106, 108, each of the first support members 164 have engaged the base wall 210 of the musical instrument 100 and each of the second support members 170 have engaged a sidewall 212 of the musical instrument 100. In certain more particular embodiments, each of the first and second support members 164, 170 of each of the first and second cradle arm assemblies 106, 108 may rotate to fit against the base wall 210 and the sidewall 212 of the musical instrument 102 more accurately.

According to certain embodiments, a rotation of the first and second support members 164, 170 of each of the first and second cradle arm assemblies 106, 108 may result in one or more support member springs 184 (see FIGS. 4A and 4B) being engaged and rotated, thereby applying a rotational force to the first and second support members 164, 170 of each of the first and second cradle arm assemblies 106, 108, thereby forming a more secure fit between the first support members 164 and the base wall 210 and the second support members 170 and the sidewalls 212.

To remove the musical instrument 102 from the musical instrument stand 100, the user may lift the musical instrument 102 upwardly away from the base 104 of the musical instrument stand 100, thereby allowing the first and second cradle arm assemblies 106, 108 to rotate from the unfolded, in-use position 194 and return to the unfolded, not-in-use 192 position. Likewise, removal of the musical instrument 102 may allow the support member springs 184 to disengage, thereby allowing each of the first and second support members 164, 170 of the first and second cradle arm assemblies 106, 108 to rotate and return to the unfolded, not-in-use position 192, reversing the transitions as depicted in FIGS. 7D to 7C to 7B. The user may then secure each of the first and second cradle arm assemblies 106, 108 in one or more of the cradle arm assembly locking mechanisms 202, thereby securing each of the first and second cradle arm assemblies 106, 108 within the perimeter of the base 104. Finally, the user may disengage the leg assembly locking mechanism 142, rotate each of the first and second leg assemblies 110, 112, and secure the musical instrument stand 100 in the folded position 114, using one or both of the strap 208 and the musical instrument stand locking mechanism 206, as needed.

Advantageously, the folded position 114 of the musical instrument stand 100 wherein each of the first and second cradle arm assemblies 106, 108 fit within the perimeter of the base 104, the strap 208, the cradle arm assembly locking mechanism 202, and the musical instrument stand locking mechanism 206 allow the user to store and transport the musical instrument stand 100 easily and efficiently, while also keeping the components of the musical instrument stand 100 safe from damage. The leg assembly locking mechanism 142 prevents the base 104 from collapsing during use. The first and second hinge covers 134, 140 may protect the base 104 and the musical instrument 102 from damage during use and may also function as the leg assembly locking mechanism 142, according to the certain embodiments.

The foot component 146 may prevent damage to the surface on which the musical instrument stand 100 is placed and, according to certain embodiments, also secure each of the first and second cradle arm assemblies 106, 108 with respect to the base 104 when the musical instrument stand 100 is in either the folded position 114 or the unfolded, not-in-use position 192.

The rotation of the first a second cradle arm assemblies 106, 108 with respect to the base 104 allows the musical instrument stand 100 to seamlessly rotate between the unfolded, not-in-use position 192 where the first and second cradle arm assemblies 106, 108 are protected within the perimeter of the base 104 and the unfolded, in-use position 194 where each of the first and second cradle arm assemblies 106, 108 engage the musical instrument 102 and secure the musical instrument 102 in place. As such, the musical instrument stand 100 is compact during storage and transport.

With reference again to FIGS. 4A and 6, the positioning of the one or more cradle arm pins 196 at the first ends 160, 166 of the first and second swing arms 156, 158 of each of the first and second cradle arm assemblies 106, 108 allows the second support members 170 of each of the first and second cradle arm assemblies 106, 108 to rotate over a greater distance, as needed, and to accommodate and adjust to a variety of different musical instruments 102 having various widths, shapes, and sizes. Additionally, the V-shape of one or both of the first and second support members 164, 170 of each of the first and second cradle arm assemblies 106, 108 may allow the first and second support members 164, 170 to more precisely engage with a variety of musical instruments 102 having various shapes and sizes and more securely position the musical instrument 102 in the musical instrument stand 100. Likewise, the rotational force applied by the support member springs 184 to one or both of the first and second support members 164, 170 of each of the first and second cradle arm assemblies 106, 108 may allow one or both of the first and second support members 164, 170 to engage with the base wall 210 more firmly and/or the sidewalls 212 of musical instrument 102 thereby militating against unintended forward, backward, and side-to-side motion of the musical instrument 102. Additionally, the rotation of the first and second support members 164, 170 of each of the first and second cradle arm assemblies 106, 108 with respect to the first and second swing arms 156, 158 allows the user to gently position the musical instrument 102 in the musical instrument stand 100 without rubbing, scraping, or harming the musical instrument 102.

Figure 13:
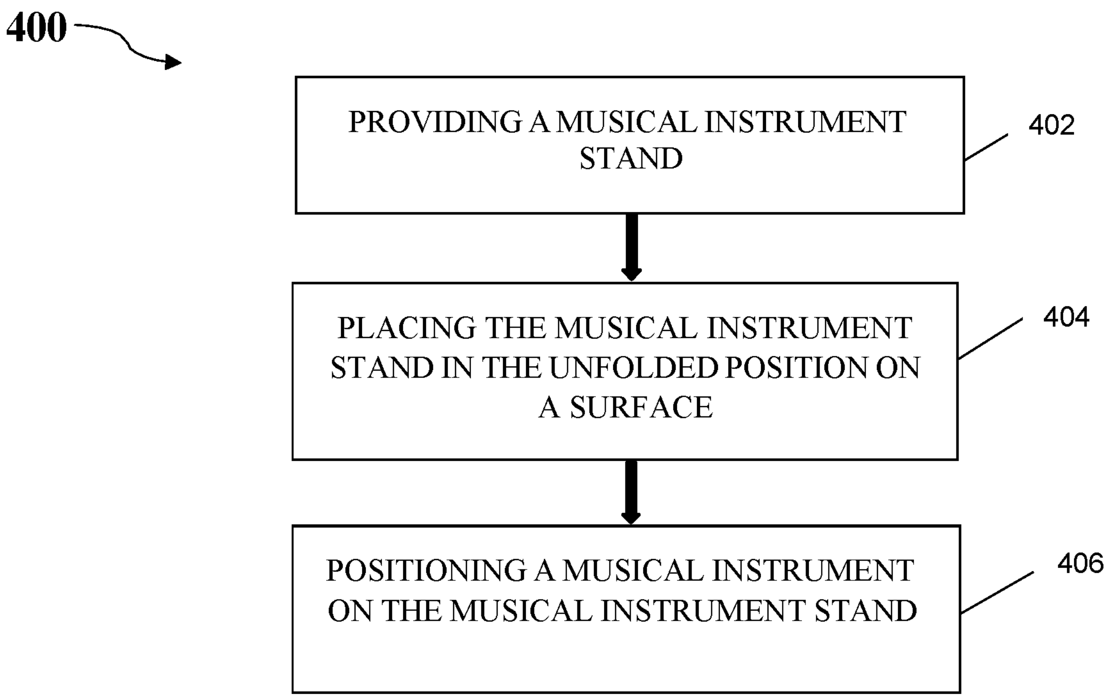
FIG. 13 is a method of using a musical instrument stand, according to an embodiment of the present disclosure.

In yet another embodiment of the present disclosure, with reference to FIG. 13, a method 400 of using the musical instrument stand 100, is shown. The method 400 may include a first step 402 of providing the musical instrument stand 100. The method 400 may further include a second step 404 of placing the musical instrument stand 100 in the unfolded position 116 on a surface. A third step 406 may include positioning a musical instrument 102 on the musical instrument stand 100.

It should be appreciated that additional steps may be included, as determined by one of skill in the art. As non-limiting examples, various steps relating to the setup of the musical instrument stand 100 such as removing the strap 208 or cover, unlocking the musical instrument stand 100, and positioning, adjusting, and locking the first and second leg assemblies 110, 112 may be included. Likewise, the adjustment of various components such as the base 104, the first and second cradle arm assemblies 106, 108, and, more specifically, the first and second swing arms 156, 158 and the first and second support members 164, 170 may be included. The method 400 for using the musical instrument stand 100 may also include repeating or omitting various steps, as required. As one non-limiting example, the musical instrument 102 may be positioned and removed more than once to secure an optimal fit between the musical instrument 102 and the musical instrument stand 100. Advantageously, the musical instrument stand 100 and the method 400 of using the musical instrument stand 100 may be used in a multitude of settings and may be adjusted to fit musical instruments 102 having variable dimensions.

Example embodiments are provided so that this disclosure will be through and fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, components and methods may be made within the scope of the present technology, with substantially similar results.

What is claimed is:

1. A musical instrument stand, comprising:
- a base including a first leg assembly that is rotatingly connected to a second leg assembly;
- a hinge cover disposed on the base;
- a first cradle arm assembly rotatingly connected to the base; and
- a second cradle arm assembly rotatingly connected to the base;
- wherein each of the first cradle arm assembly and the second cradle arm assembly is configured to rotate with respect to the base when the musical instrument stand is in an unfolded position, and
- wherein each of the first cradle arm assembly and the second cradle arm assembly is connected to the first leg assembly and the second leg assembly, respectively, using a cradle arm pin, a cradle arm cap, and a cradle arm spacer.

2. The musical instrument stand of claim 1, wherein each of the first leg assembly and the second leg assembly includes a first longitudinal member, a second longitudinal member, and a transverse member disposed between the first longitudinal member and the second longitudinal member.

3. The musical instrument stand of claim 1, wherein a plurality of pins rotatingly connects the first leg assembly to the second leg assembly.

4. The musical instrument stand of claim 2, wherein the hinge cover includes a leg assembly locking mechanism configured to secure the musical instrument stand in the unfolded position.

5. The musical instrument stand of claim 4, wherein the hinge cover includes a first hinge cover and a second hinge cover, each of the first hinge cover and the second hinge cover configured to lock each of the first leg assembly and the second leg assembly in the unfolded position.

6. The musical instrument stand of claim 5, wherein the first hinge cover connects each of the first longitudinal member of the first leg assembly and the first longitudinal member of the second leg assembly to each other.

7. The musical instrument stand of claim 5, wherein the second hinge cover connects the second longitudinal member of the first leg assembly and the second longitudinal member of the second leg assembly to each other.

8. The musical instrument stand of claim 2, wherein at least one of the transverse member of the first leg assembly and the transverse member of the second leg assembly includes a foot, the foot having a cradle arm assembly locking mechanism.

9. The musical instrument stand of claim 1, wherein each of the first cradle arm assembly and the second cradle arm assembly is disposed within a perimeter of the base when the musical instrument stand is in a folded position and when the musical instrument stand is in an unfolded position.

10. A musical instrument stand, comprising:
- a base;
- a hinge cover disposed on the base;
- a first cradle arm assembly rotatingly connected to the base; and
- a second cradle arm assembly rotatingly connected to the base;
- wherein each of the first cradle arm assembly and the second cradle arm assembly is configured to rotate with respect to the base when the musical instrument stand is in an unfolded position, and
- wherein each of the first cradle arm assembly and the second cradle arm assembly includes a first swing arm, a second swing arm, a first support member, and a second support member.

11. The musical instrument stand of claim 10, wherein the second support member is V-shaped, and is rotatingly connected to the first swing arm and the second swing arm.

12. The musical instrument stand of claim 10, wherein each of the first support member and the second support member is rotatingly connected to the first swing arm and the second swing arm.

13. The musical instrument stand of claim 11, wherein at least one support member spring is configured to apply a rotational force to the second support member.

14. The musical instrument stand of claim 1, wherein the musical instrument stand includes at least one strap.

15. The musical instrument stand of claim 10, wherein the first support member is configured to receive a base wall of a musical instrument and the second support member is configured to receive a sidewall of the musical instrument.

16. A musical instrument stand, comprising:
- a base having a hinge cover disposed on the base and a first leg assembly that is rotatingly connected to a second leg assembly;

a first cradle arm assembly rotatingly connected to the first leg assembly of the base; and a second cradle arm assembly rotatingly connected to the second leg assembly of the base;

a cradle arm assembly locking mechanism disposed on the base and configured to engage with one of the first cradle arm assembly and the second cradle arm assembly;

wherein each of the first cradle arm assembly and the second cradle arm assembly is configured to rotate with respect to the base when the musical instrument stand is in an unfolded, in-use position; and wherein each of the first cradle arm assembly and the second cradle arm assembly is secured within a perimeter of the base when the musical instrument stand is in a folded position and when the musical instrument stand is in an unfolded, not-in-use position, and wherein each of the first cradle arm assembly and the second cradle arm assembly is connected to the first leg assembly and the second leg assembly, respectively, using a cradle arm pin, a cradle arm cap, and a cradle arm spacer.

17. The musical instrument stand of claim 16, wherein the base includes at least one foot having the cradle arm assembly locking mechanism.

18. A method of using a musical instrument stand, comprising:

providing the musical instrument stand of claim 1; and positioning a musical instrument on the musical instrument stand.

* * * * *